United States Patent
Perreault et al.

(10) Patent No.: US 10,659,771 B2
(45) Date of Patent: May 19, 2020

(54) NON-PLANAR COMPUTATIONAL DISPLAYS

(71) Applicant: Google LLC, Mountain View, CA (US)

(72) Inventors: John D. Perreault, Mountain View, CA (US); Patrick Llull, San Jose, CA (US)

(73) Assignee: Google LLC, Mountain View, CA (US)

( * ) Notice: Subject to any disclaimer, the term of this patent is extended or adjusted under 35 U.S.C. 154(b) by 18 days.

(21) Appl. No.: 15/952,508

(22) Filed: Apr. 13, 2018

(65) Prior Publication Data
US 2019/0020869 A1 Jan. 17, 2019

Related U.S. Application Data

(60) Provisional application No. 62/532,123, filed on Jul. 13, 2017.

(51) Int. Cl.
*H04N 13/00* (2018.01)
*H04N 13/344* (2018.01)
(Continued)

(52) U.S. Cl.
CPC ......... *H04N 13/344* (2018.05); *G02B 3/0006* (2013.01); *G02B 27/01* (2013.01);
(Continued)

(58) Field of Classification Search
CPC .. H04N 13/383; H04N 13/344; H04N 13/307; G02B 27/01; G02B 2027/0123;
(Continued)

(56) References Cited

U.S. PATENT DOCUMENTS

| 2015/0049390 A1* | 2/2015 | Lanman | G02B 27/0075 359/622 |
| 2016/0131914 A1* | 5/2016 | Lux | A61B 3/113 345/8 |

(Continued)

OTHER PUBLICATIONS

Huang et al. "The Light Field Stereoscope: Immersive Computer Graphics via Factored Near-Eye Light Field Displays with Focus Cues". ACM Transactions on Graphics, vol. 34, No. 4, Article 60, Aug. 2015. (Year: 2015).*

(Continued)

*Primary Examiner* — Zhihan Zhou

(57) ABSTRACT

A near-eye display system includes one or more non-planar display panels and a lenslet array to display a near-eye lightfield frame. The near-eye display system further includes a rendering component to render, based on a stereoscopic focus volume associated with a set of display geometry data of the one-or more non-planar display panels, the array of elemental images in the near-eye lightfield frame such that objects within the stereoscopic focus volume are perceived to be in focus by the user's eye. A method of operation of the near-eye display system includes receiving display geometry data for one or more non-planar display panels of the near-eye display system and rendering, based on a stereoscopic focus volume, an array of elemental images at a position within a near-eye lightfield frame such that the non-planar display panels presents objects within the stereoscopic focus volume to be in focus.

20 Claims, 8 Drawing Sheets

(51) Int. Cl.
   *H04N 13/307*    (2018.01)
   *G02B 27/01*     (2006.01)
   *G02B 3/00*      (2006.01)
   *H04N 13/383*    (2018.01)

(52) U.S. Cl.
   CPC ....... *G02B 27/017* (2013.01); *G02B 27/0172* (2013.01); *H04N 13/307* (2018.05); *H04N 13/383* (2018.05); *G02B 2027/014* (2013.01); *G02B 2027/0123* (2013.01); *G02B 2027/0134* (2013.01); *G02B 2027/0138* (2013.01)

(58) Field of Classification Search
   CPC .............. G02B 27/0172; G02B 27/017; G02B 2027/0134; G02B 2027/0138; G02B 2027/014; G02B 3/0006
   See application file for complete search history.

(56) References Cited

U.S. PATENT DOCUMENTS

2017/0108697 A1*   4/2017   El-Ghoroury ...... G02B 27/0081
2017/0115432 A1*   4/2017   Schmidtlin ........ G02B 27/0172

OTHER PUBLICATIONS

International Search Report and Written Opinion dated Aug. 9, 2018 for corresponding International Application No. PCT/US2018/032675, 11 pages.

International Preliminary Report on Patentability dated Jan. 23, 2020 for corresponding International Application No. PCT/US2018/032675, 7 pages.

* cited by examiner

NON-PLANAR COMPUTATIONAL DISPLAYS

CROSS REFERENCE TO RELATED APPLICATIONS

This application is related to U.S. Provisional Patent Application 62/532,123, entitled "NON-PLANER COMPUTATIONAL DISPLAYS" and filed on Jul. 13, 2017, the entirety of which is incorporated by reference herein.

BACKGROUND

Immersive virtual reality (VR) and augmented reality (AR) systems typically utilize head-mounted displays (HMDs) and other near-eye display systems to present stereoscopic imagery to the user so as to give a sense of presence in a three-dimensional (3D) scene. Conventional HMDs can utilize a near-eye lightfield display or other computational display to provide display of three-dimensional (3D) graphics. Generally, the near-eye lightfield display employs one or more display panels and a number of lenses, pinholes, or other optical elements that overlie the one or more display panels. A rendering system renders an array of elemental images, with each elemental image representing an image or view of an object or scene from a corresponding perspective or virtual camera position.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate example methods and systems for incorporating non-planar displays and generating stereoscopic focus volumes in a near-eye display system. In at least one embodiment, the near-eye display system employs non-planar computational displays to display near-eye lightfield frames of imagery to a user so as to provide the user with an immersive VR or AR experience. Each near-eye lightfield frame is composed of an array of elemental images, with each elemental image representing a view of an object or scene from a different corresponding viewpoint.

Many conventional HMD devices implement either a single flat display that is separated into two independent display regions, one for the left eye and one for the right eye of the user, or a pair of independent flat displays, one for each eye of the user. Such devices also typically include a single lens for each eye so as to focus the entire image of the display into the user's eye. However, the use of flat displays and a single lens for each eye often results in a bulky HMD form factor, which in turn imparts a high moment of inertia when in use. Moreover, the flat displays and lenses constrain the total lateral field of view (FOV), often to 110 degrees or less. The bulky size and limited field of view of these conventional HMD devices can deleteriously impact the user's sense of presence in the displayed image and thus inhibit the feeling of being immersed in the presented scene.

To provide improved HMD form-factors without reductions in field of view (FOV) and/or depth of field, in at least one embodiment the near-eye display systems described herein utilize a non-planar computational display configuration wherein objects within a stereoscopic focus volume associated with the non-planar computational display(s) are perceived to be in focus. As an example, conventional near-eye display systems often have a planar HMD form factor which requires both left- and right-image-planes (that is, the image planes for the left eye and right eye display panels of the HMD) to be co-planar in order for an object to be perceived as in focus. However, such planar HMD form factors require a large display panel, resulting in a "diving mask" product envelope in order to maintain a sufficient FOV. The near-eye display systems described herein enable a wrap-around or non-planar form factor by pairing one or more non-planar display panels with a lenslet array having larger depth of fields to render focus volume in three-dimensional (3D) space. The volume at which these focus volumes overlap represents a stereoscopic focus volume within which both eyes of the user may perceive objects to be in focus without reducing the FOV of the near-eye display system.

Figure 1:
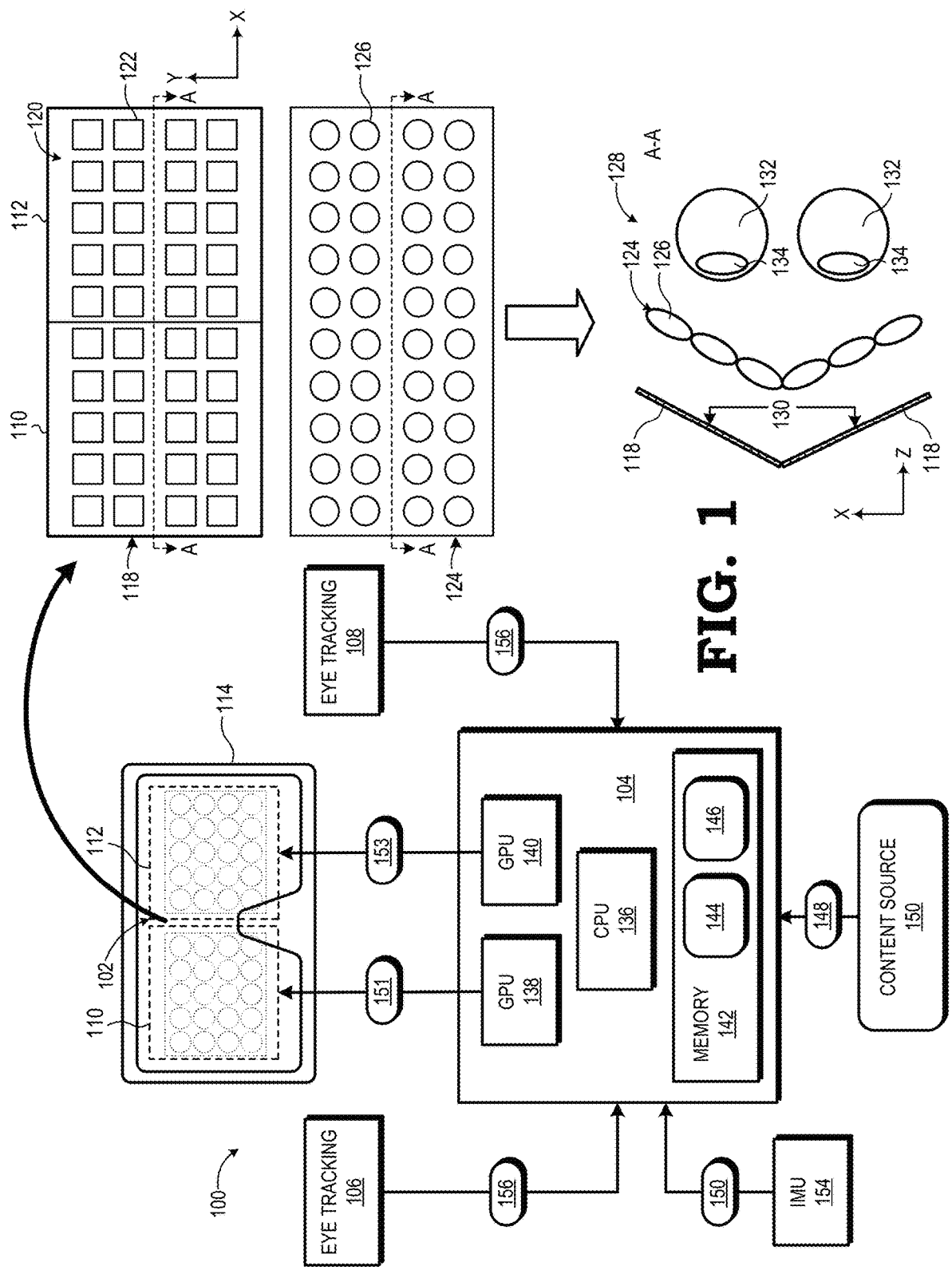
FIG. 1 is a diagram illustrating a near-eye display system incorporating non-planar displays for generating stereoscopic focus volumes in accordance with some embodiments.

FIG. 1 illustrates a near-eye display system 100 incorporating non-planar displays for generating stereoscopic focus volumes in accordance with at least one embodiment. In some embodiments, the near-eye display system 100 may be a HMD device having a form factor in which the HMD is mounted to a user's face. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of near-eye lightfield frames (hereinafter, "lightfield frame" for ease of reference), each of which comprises an array 120 of elemental images 122. For ease of reference, an array 120 of elemental images 122 may also be referred to herein as a lightfield frame 120. Each of the displays 110, 112 further includes an array 124 of lenslets 126 (also commonly referred to as "microlenses") overlying the display panel 118. Typically, the number of lenslets 126 in the lenslet array 124 is equal to the number of elemental images 122 in the array 120, but in other implementations the number of lenslets 126 may be fewer or greater than the number of elemental images 122. Note that while the example of FIG. 1 illustrates a 10×4 array of elemental images 122 and a corresponding 10×4 array 120 of lenslets 126 for ease of illustration, in a typical implementation the number of elemental images 122 in a lightfield frame 120 and the number of lenslets 126 in the lenslet array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the lenslet array 124 overlying the display panels 118 such that the lenslet array 124 overlies the display surface 130 of each display panel 118 so as to be disposed between the display surface 130 and the corresponding eyes 132 of the user. In this configuration, each lenslet 126 focuses a corresponding region of the display surface 130 onto the pupil 134 of the eye, with each such region at least partially overlapping with one or more adjacent regions. Thus, when an array 120 of elemental images 122 is displayed at the display surface 130 of the display panels 118 and then viewed by the eye 132 through the lenslet array 124, the user perceives the array 120 of elemental images 122 as a single image of a scene. Accordingly, when this process is performed in parallel for both the left eye and right eye of the user with the proper parallax implemented therebetween, the result is the presentation of autostereoscopic three-dimensional (3D) imagery to the user.

Further, as shown in cross-view 128, the display panel 118 of the left-eye display 110 and the display panel 118 of the right-eye display 112 are positioned in a non-planar orientation relative to each other (as opposed to conventional VR/AR displays in which the left- and right-eye image planes presented by display panels are co-planar). Although each of the left-eye display 110 and the right-eye display 112 is depicted in this example as having a single display panel 118, in other embodiments, each of the displays 110, 112 may include any "N" number of display panel segments (each also referred to herein as a "display panel tile"). For example, in some embodiments (such as described below relative to FIG. 4), each of the displays 110, 112 includes two non-planar display panels. Those skilled in the art will recognize that as the number of display panel segments increases, the display surfaces of the displays 110, 112 will increasingly approximate a curve.

In other embodiments, rather than having N number of display panel segments, each of the displays 110, 112 includes a continuous display panel with different lateral portions having differing degrees of curvature (or substantially no curvature), different orientations, or a combination thereof, such that each portion represents a separate logical section or "tile" of the displays 110, 112 (such as described below relative to FIGS. 2 and 5). That is, while each of the left- and right-eye displays 110, 112 includes a set of pixel rows that extend across the entire lateral extent of the display panel and which are driven by the same display driver hardware, the display panel may be logically organized as a set of adjacent lateral sections based on changes in the curvature of the display panel in the section or based on the orientation of the section relative to the corresponding eye of the user. The curved left- and right-eye displays 110, 112 may be implemented using any of a variety of display technologies capable of providing a display panel with a varying curvature or orientation configuration, such as a thin-film flexible organic light emitting diode (OLED)-based display that is flexed into the desired curvatures and sectional orientations and maintained as such via a supporting frame. Further, the lenslet array 124 includes a plurality of lenslets 126 that are focused on a corresponding section of the associated display panel. That is, the optical axis of each lenslet 126 intersects the display surface 130 of a corresponding display panel section (referred to herein as a "display panel tile"), and in some embodiments, the optical axis is normal to the face of the corresponding display panel.

As also shown in FIG. 1, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 comprising executable instructions for a lightfield frame rendering process, as described below, as well as an eye tracking program 146 comprising executable instructions for a stereoscopic volume generation process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of lightfield frames 151 for display at the left-eye display 110 and a series of lightfield frames 153 for display at the right-eye display 112 using any of a variety of well-known VR/AR computational/lightfield rendering processes. As part of this rendering process, the CPU 136 may receive pose information 150 from an inertial management unit (IMU) 154, whereby the pose information 150 is representative of a pose of the display sub-system 102 and control the rendering of one or more pairs of lightfield frames 151, 153 to reflect the viewpoint of the object or scene from the pose.

To this end, the eye tracking components 106, 108 each may include one or more infrared (IR) light sources (referred to herein as "IR illuminators) to illuminate the corresponding eye with IR light, one or more imaging cameras to capture the IR light reflected off of the corresponding eye as a corresponding eye image (eye image information 156), one or more mirrors, waveguides, beam splitters, and the like, to direct the reflected IR light to the imaging cameras, and one or more processors to execute the eye tracking program 146 so as to determine a current position, current orientation, or both (singularly or collectively referred to herein as "pose") of the corresponding eye from the captured eye image. Any of a variety of well-known eye tracking apparatuses and techniques may be employed as the eye tracking components 106, 108 to track one or both eyes of the user.

In at least one embodiment, the near-eye display system 100 may determine the eye pose as a past eye pose, a current eye pose, or a predicted (future) eye pose, or a combination thereof. In particular, a prediction of a future eye pose may provide improved performance or response time, and any of a variety of eye-movement prediction algorithms may be implemented to predict a future eye pose. Moreover, in some instances, the eye-tracking components 106, 108 may utilize scene information (e.g., location of faces within the imagery to be rendered or saliency heuristics) as input in prediction of a future gaze of the user's eyes for eye pose calculation. As such, the term "eye pose", as used herein, may refer to a previous, current, or predicted eye pose, or some combination thereof.

As described in more detail herein, in at least one embodiment the near-eye display system 100 generates stereoscopic focus volumes by determining stereoscopic focus volume within which objects would appear to be in focus to both the left and right eyes 132 of the user. Through the use of display panel sections with different curvatures and/or orientations relative to the user's eye, the near-eye display system 100 may be fabricated with a form factor that maintains the bulk of the HMD closer to the user's head, thereby reducing its moment of inertia as well as providing a wider lateral field of view and a more aesthetically pleasing appearance.

Figure 2:
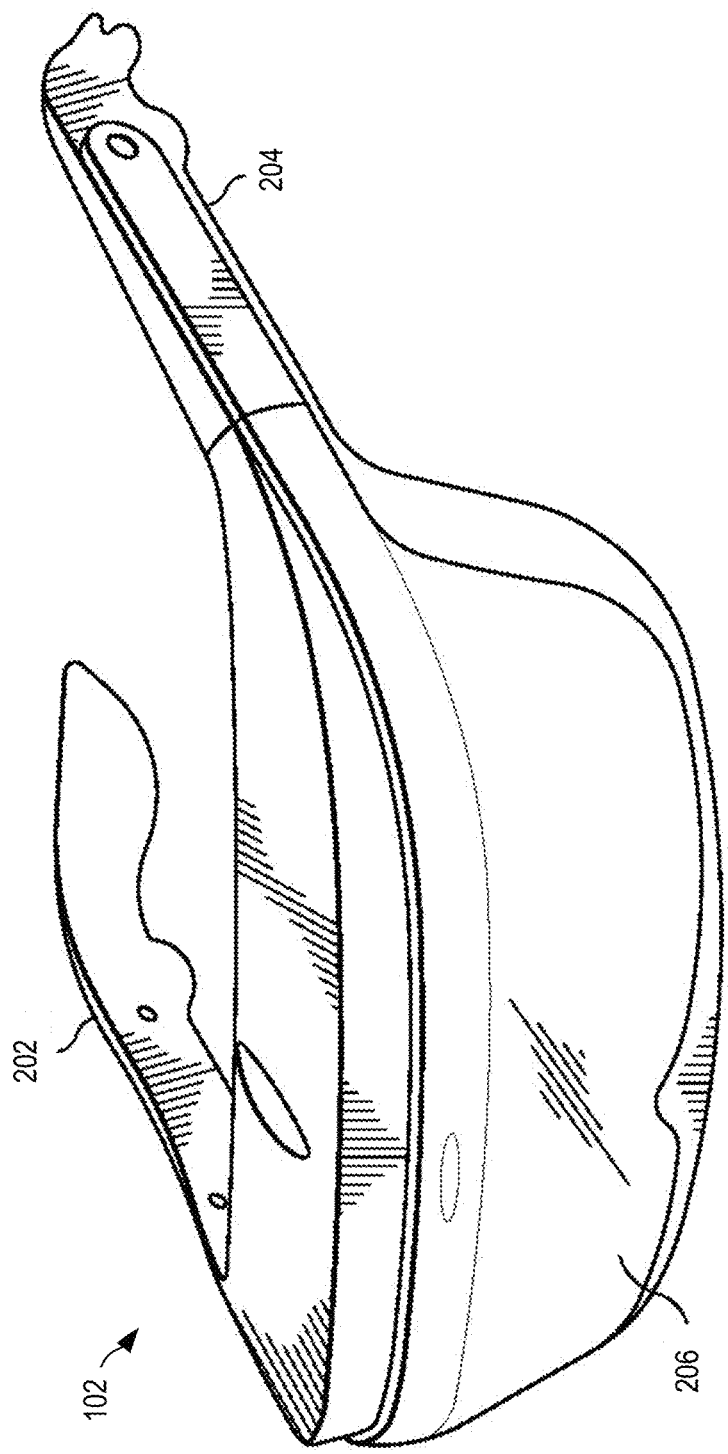
FIG. 2 illustrates a perspective view of a near-eye display system of FIG. 1 incorporating non-planar displays for generation of stereoscopic focus volumes in accordance with some embodiments.

FIG. 2 illustrates a perspective view of non-planar computational displays such as the ones utilized in the near-eye display system 100 for generation of stereoscopic focus volumes in accordance with some embodiments. In accordance with an illustrative embodiment of the present disclosure, FIG. 2 illustrates the near-eye display system 100 as a HMD 200 having an "eyeglass" form factor in which the HMD device 200 is mounted to a user's face via temples 202, 204, which are positioned on or behind the user's ears when worn by the user. However, in other embodiments the HMD device 200 may be implemented with a "mask" form factor in which the HMD device 200 is mounted to the user's face via one or more straps, harnesses, or other attachment devices. Further, although omitted for ease of illustration, the HMD device 200 also may include one or more face gaskets to seal against the user's face for the purposes of limiting ambient light intrusion. In the depicted example, the HMD 200 device has a housing 206 such that display devices (e.g., left- and right-eye displays 110, 112 of FIG. 1) mounted on or within the housing 206 are arranged in front of the user's eyes. As described further herein, a processor coupled to or embedded within the housing 206 generates AR/VR content for display at the display devices, thereby immersing the user in a AR/VR environment associated with the AR/VR content.

Figure 3:
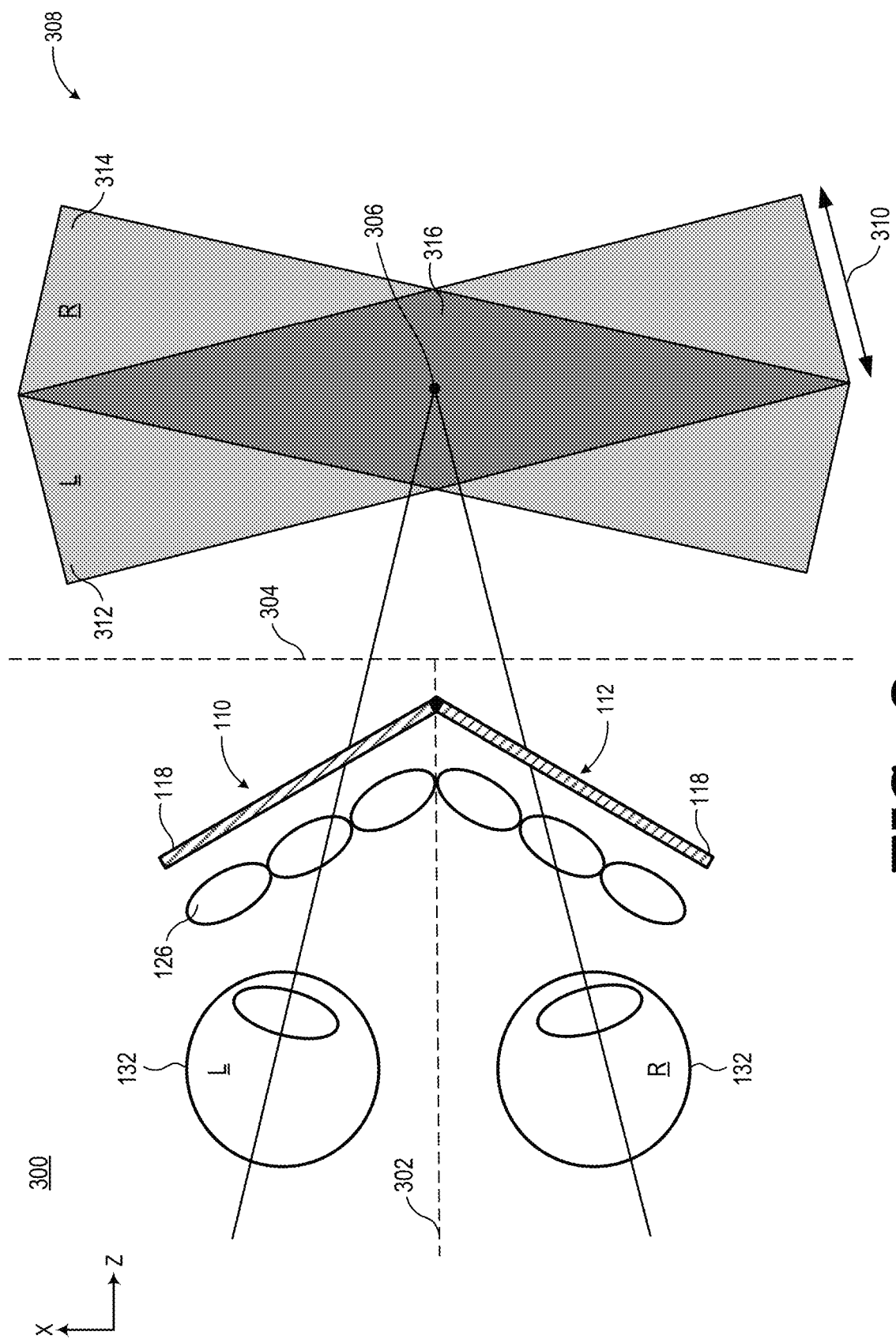
FIG. 3 is a diagram illustrating an example of non-planar computational displays in the near-eye display system of FIG. 1 for generation of stereoscopic focus volumes in accordance with some embodiments.

FIG. 3 is a diagram illustrating a cross-section view 300 of non-planar computational displays such as the ones utilized in the near-eye display system 100 cut along line A-A of FIG. 1 in accordance with some embodiments. As shown, the display panels 118 and lenslets 126 are substantially symmetric about a medial plane 302 that corresponds to a midsagittal plane of the user when wearing the near-eye display system 100. Further, the display panels 118 are non-planar relative to each other and to plane 304. The plane 304 is generally parallel to a coronal plane of the user, and further generally corresponds to a plane at which a display of a conventional HMD would be positioned.

As shown in this view, the eyes 132 of the user are directed towards a point 306 within a virtual image 308 that includes a number of objects (not shown) intended to be perceived by the eyes 132 at different depths. The depth of field 310 (i.e., distance between the nearest and the furthest objects that will be perceived to be in focus by the eyes 132) due to the lenslets 126 leads to volumes within virtual image 308 within which objects would appear to be in focus.

In particular, objects within a left eye focus volume 312 would appear to be in focus to the left eye 132 of the user when presented for display by the display panel 118 of the left-eye display 110. Similarly, objects within a right eye focus volume 314 would appear to be in focus to the right eye 132 of the user when presented for display by the display panel 118 of the right-eye display 112. In various embodiments, the depth of field of the left eye focus volume 312 and the right eye focus volume 314 may be determined using the following equation:

$$dPhi = 2c/(d*f) \qquad (1)$$

wherein dPhi represents the depth of field in diopters, c represents the display pixel size in meters, d represents lenslet diameter in meters, and f represents lenslet focal length in meters.

As illustrated in FIG. 3, the left eye focus volume 312 and the right eye focus volume 314 overlap at a stereoscopic focus volume 316. Accordingly, lightfield frames are rendered based on the non-planar configuration of the display panels 118 and objects within the stereoscopic focus volume 316 would appear to be in focus to both the left and right eyes 132 of the user.

In some embodiments, a set display geometry data is provided to the rendering component 104 regarding, for example, physical dimensions and geometry for one or more of the non-planar display panels 118 and lenslets 126. For example, the set of display geometry data may include various data such as the width of the display panels 118, viewing distances between the eyes 132 and the panels 118, the angle between the panels 118 and plane 304, the angle between the panels and the medial plane 302, and the like. Those skilled in the art will recognize that the positions of the left eye focus volume 312 and the right eye focus volume 314 in 3D space are determined by the lenslet 126 and non-planar display panel 118 dimensions/geometries. However, in various embodiments, the position of virtual planes within such left- and right-eye focus volumes 312, 314 and stereoscopic focus volume 316 may be rotated within the focus volumes.

Figure 4:
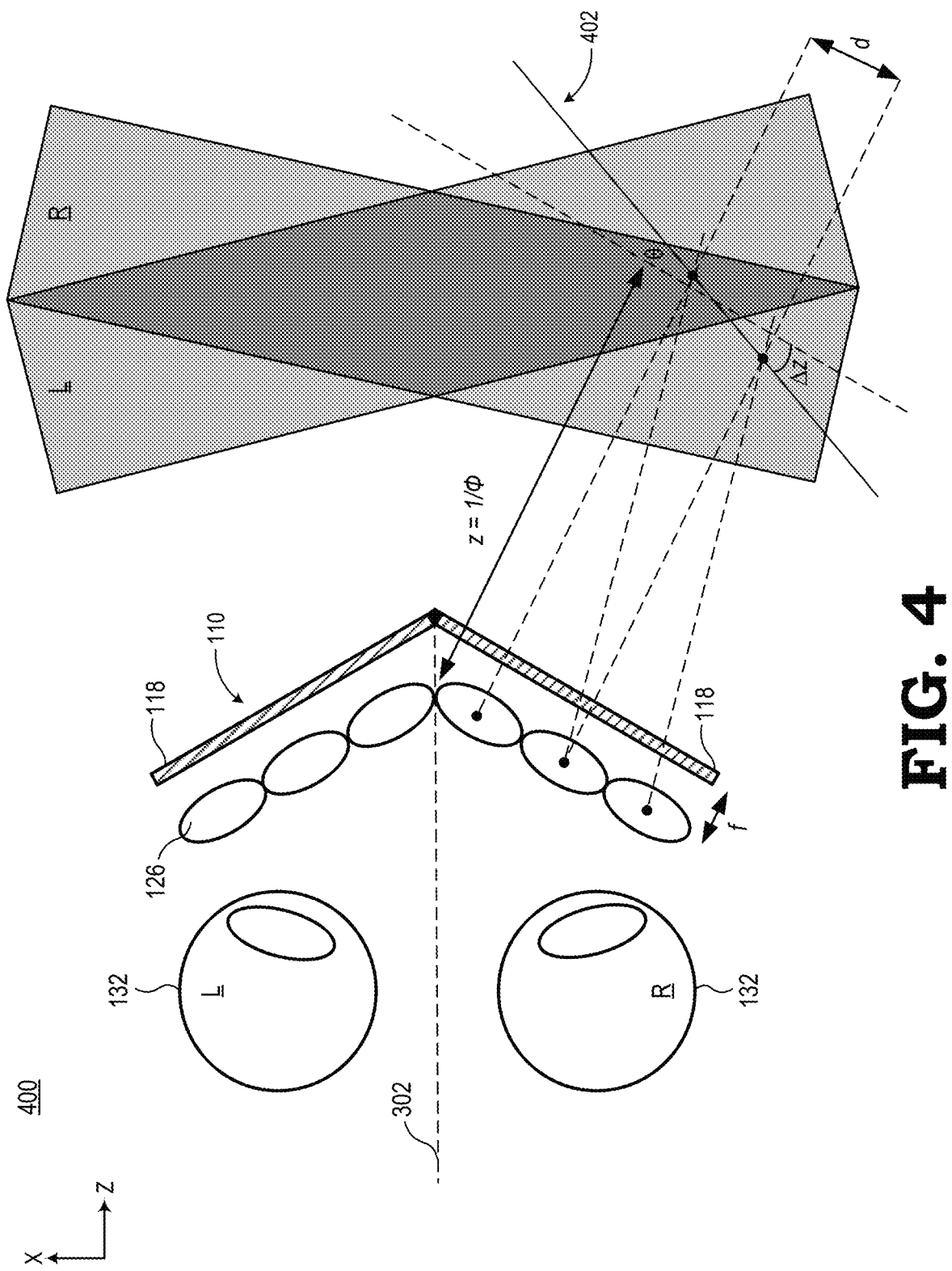
FIG. 4 is a diagram illustrating an example of virtual plane rotation in the near-eye display system of FIG. 1 in accordance with some embodiments.

For example, FIG. 4 depicts a diagram illustrating a cross-section view 400 of the non-planar computational displays with rotation of virtual plane 402. In various embodiments, the virtual plane 402 may be rotated by shifting the display position of elemental images by an amount using the following equation:

$$dx = n*\Phi*d*f + (n*\Phi*d)^2*f*\tan(\theta) \qquad (2)$$

wherein $n=[-N/2, N/2]$ represents the lenslet number, and $\Phi = 1/z$ and represents the distance to a virtual plane in diopters, and $\theta$ represents tilt of the virtual plane 402 relative to the lenslet (i.e., angle between the display-lenslet tangent and rendered virtual plane 402). Additionally, in some embodiments, a fold angle (not shown) between the display panels may be adjustable, and a sensor is used to determine $\theta$ for the rendering component 104 to determine a shift in display position of elemental images. It is noted that eye-tracking is not necessary for such embodiments, but may optionally be used for determining other viewing parameters (e.g., eye relief distance and pupil position) if the fold angle changes or if the near-eye display system 100 moves relative to the user's eyes 132.

Figure 5:
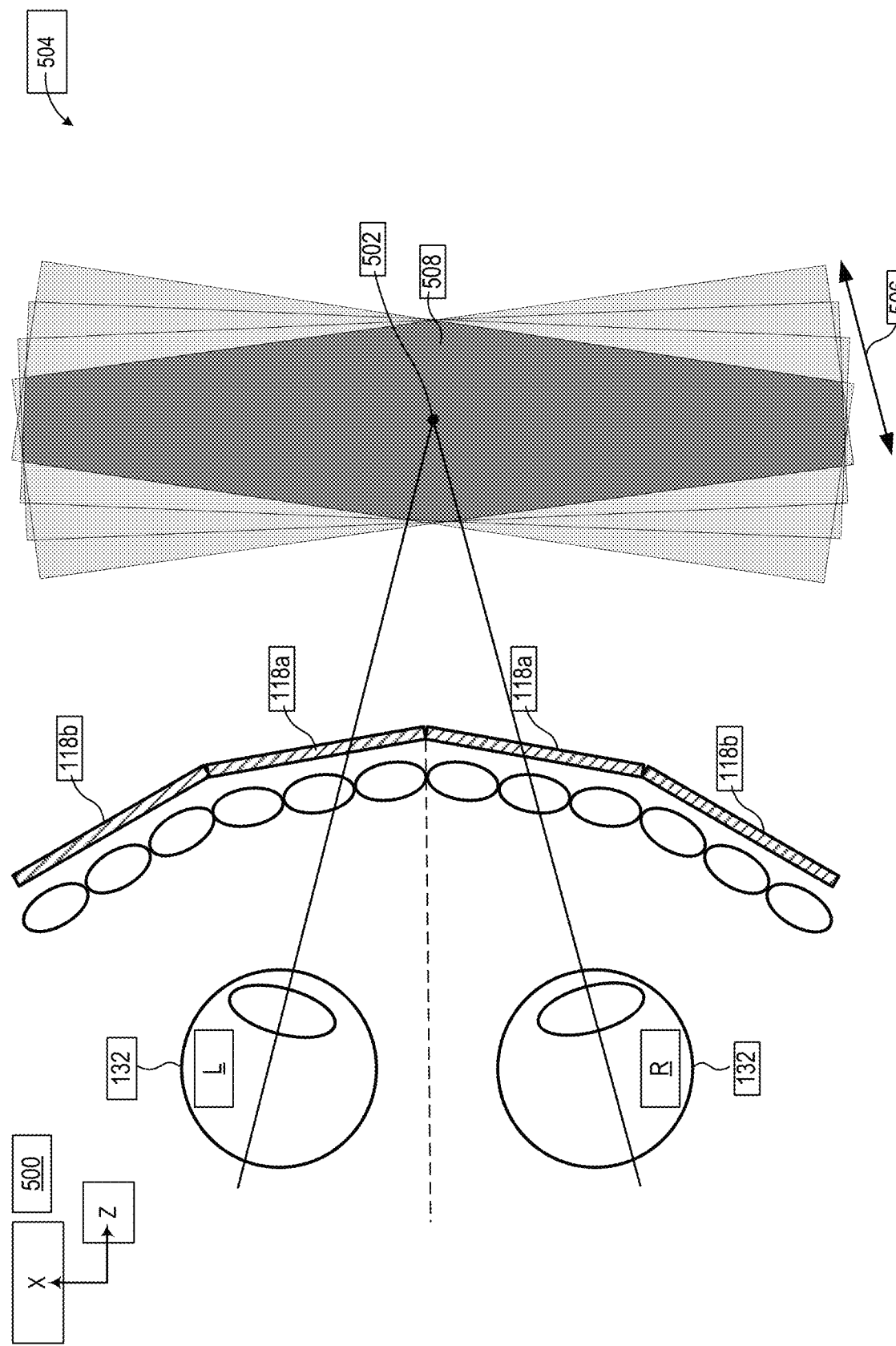
FIG. 5 is a diagram illustrating an additional example of non-planar computational displays in the near-eye display system of FIG. 1 for generation of stereoscopic focus volumes in accordance with some embodiments.

In an alternative embodiment, FIG. 5 depicts a diagram illustrating a cross-section view 500 of another implementation non-planar computational displays for generation of stereoscopic focus volumes in accordance with some embodiments. As previously discussed relative to FIG. 1, in some embodiments, each of the left- and right-eye displays 110, 112 may include any "N" number of display panel segments. For example, as illustrated in view 500, each of the displays 110, 112 includes two non-planar display panel segments (i.e., display panel segments 118a and 118b). As shown in this view, the eyes 132 of the user are directed towards a point 502 within a virtual image 504 that includes a number of objects (not shown) intended to be perceived by the eyes 132 at different depths. The depth of field 506 (i.e., distance between the nearest and the furthest objects that will be perceived to be in focus by the eyes 132) due to the lenslets 126 leads to volumes within virtual image 504 within which objects would appear to be in focus.

Similar to the example implementation discussed relative to FIG. 3, each of the display panel segments (e.g., display panel segments 118a and 118b of displays 110, 112) is associated with a corresponding focus volume within which objects would appear to be in focus when presented for display to their respective eyes 132. As illustrated in FIG. 5, these focus volumes overlap at a stereoscopic focus volume 508. Accordingly, lightfield frames are rendered based on the non-planar configuration of the display panel segments 118a, 118b and objects within the stereoscopic focus volume 508 would appear to be in focus to both the left and right eyes 132 of the user. Further, similar to the example implementation discussed relative to FIG. 4, virtual planes (not shown) in stereoscopic focus volume 508 may be rotated by shifting the display position of elemental images along the various display segments 118a and 118b based on equation (2) above.

Figure 6:
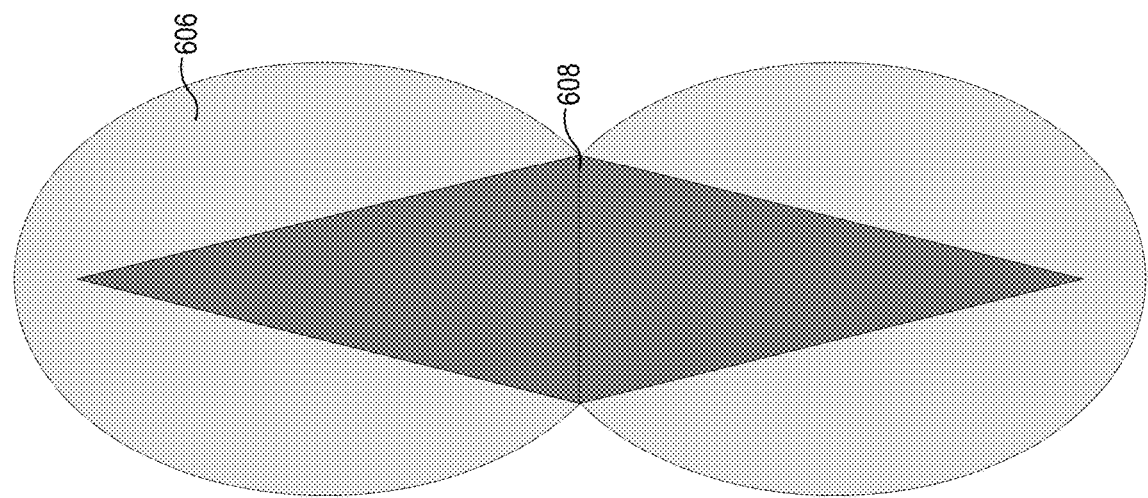
FIG. 6 is a diagram illustrating yet another example of non-planar computational displays in the near-eye display system of FIG. 1 for generation of stereoscopic focus volumes in accordance with some embodiments.
Figure 6:
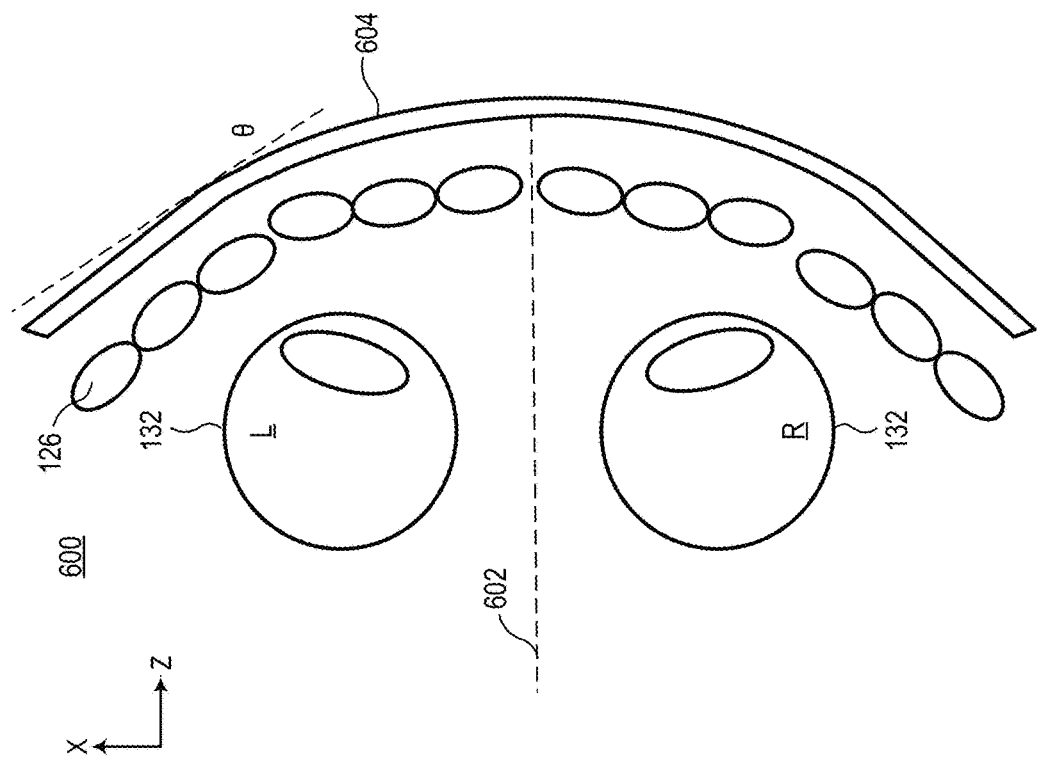

In an alternative embodiment, FIG. 6 depicts a diagram illustrating a cross-section view 600 of yet another implementation non-planar computational displays for generation of stereoscopic focus volumes in accordance with some embodiments. Similar to the example embodiment of FIG. 3, the lenslets 126 are substantially symmetric about a medial plane 602 that corresponds to a midsagittal plane of the user when wearing the near-eye display system 100. The display is a curved display panel 604, and is generally non-planar relative to a plane at which a display of a conventional HMD would be positioned. Rather than having N number of display panel segments and N number of overlapping focus volumes (i.e., 4 segments and 4 overlapping focus volumes in FIG. 5), a polygon with N segments will approach approximately a curved/circular shaped surface when the N becomes a large. As shown in FIG. 6, there will be a corresponding larger number of overlapping rectangular focus volumes 606 rotated by small angles, which form the illustrated oval shaped overlapping of focus volumes. However, similar to the example embodiment of FIG. 5, the stereoscopic focus volume 608 remains limited by the maximum display panel tilt at the edges and is generally diamond shaped. A virtual plane may be rendered at any plane within the focus volumes 606 and stereoscopic fusion may be achieved within the stereoscopic focus volume 608. The virtual plane can be shifted along the z-axis direction. Further, the same rendering equation (2) discussed above may be used for changing the rendering of images to adjust for the curved display panel 604, in which θ is determined by the local slope (or angle) between the display panel 604 relative to the rendered virtual plane (i.e. local spatial derivative or tangent of the curved surface).

Figure 7:
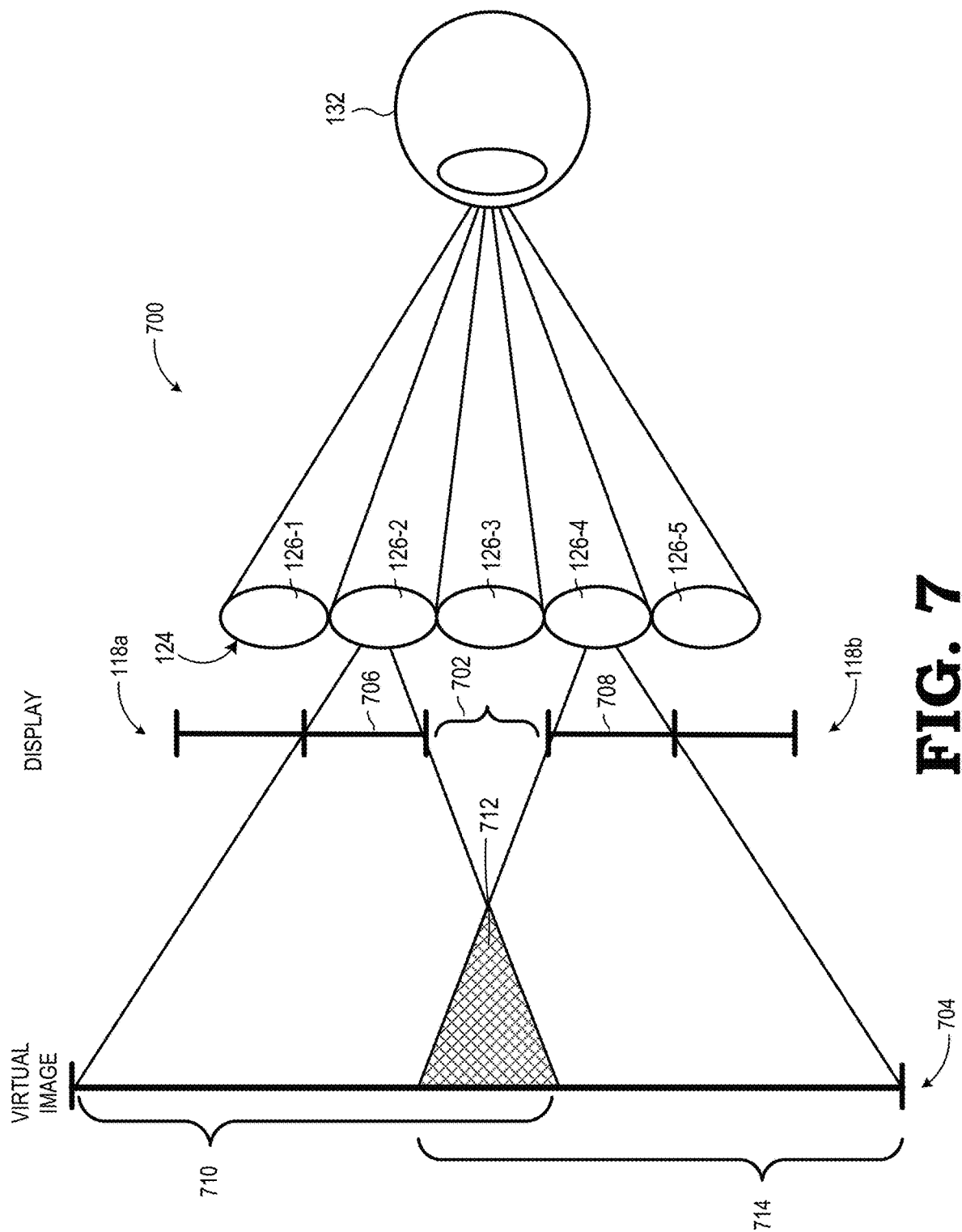
FIG. 7 is a diagram illustrating an example of gap hiding in non-planar computational displays in accordance with some embodiments.

Those skilled in the art will recognize that due to display panel segmentation, in some embodiments, only a portion of the total surface area of the left- and right-eye displays 110, 112 is visible to the user's eye. To illustrate, FIG. 7 depicts a cross-section view 700 of a computational display such as the ones utilized in the near-eye display system discussed relative to view 400 of FIG. 4 using lenslets and non-planar display panel segments. As shown in this view 700, a gap 702 exists between the display panel segments 118a and 118b due to, for example, the display border/outside frame of a housing that holds the display panel segments 118a, 118b.

Each of the lenslets 126 of the lenslet array 124 serves as a separate "projector" onto the eye 132, with each "projector" overlapping with one or more adjacent projectors in forming a composite virtual image 704 from the array of elemental images displayed at the display panel 118. To illustrate, the lenslet 126-2 projects a corresponding elemental image (represented by region 706) from region 710 of the virtual image 704 and the lenslet 126-4 projects a corresponding elemental image (represented by region 708) from region 712 of the virtual image 704. As shown by FIG. 2, regions 710 and 712 overlap in sub-region 714. Thus, image data from this overlapping sub-region 714 may be used to render the elemental images displayed by the display panel segments 118a, 118b to hide the gap 702 between the display panel segments 118a and 118b such that the composite virtual image 704 as perceived by the user's eye 132 does not detect the presence of the gap 702.

In some embodiments, if the display borders are projected out to the virtual image 704 plane, there will be dark spots where the display bezels/edges are located. The intensity of the replicated (e.g., overlapped) pixels within the surrounding elemental images are scaled by the fraction of $N+1/N$, where N is the number of elemental images sharing the blocked pixel regions. That is, the intensities of the elemental images corresponding to regions 706 and 708 may be adjusted to compensate for the gap 702.

Further, in various embodiments, the eye tracking components 106, 108 of FIG. 1 tracks changes in pose for the user's eye 132 and provides pose information to the rendering component 104 to account for any gazes by the user's eye 132 that may be directed towards a portion of the left- and right-eye displays 110, 112 having gaps between display panel segments.

Figure 8:
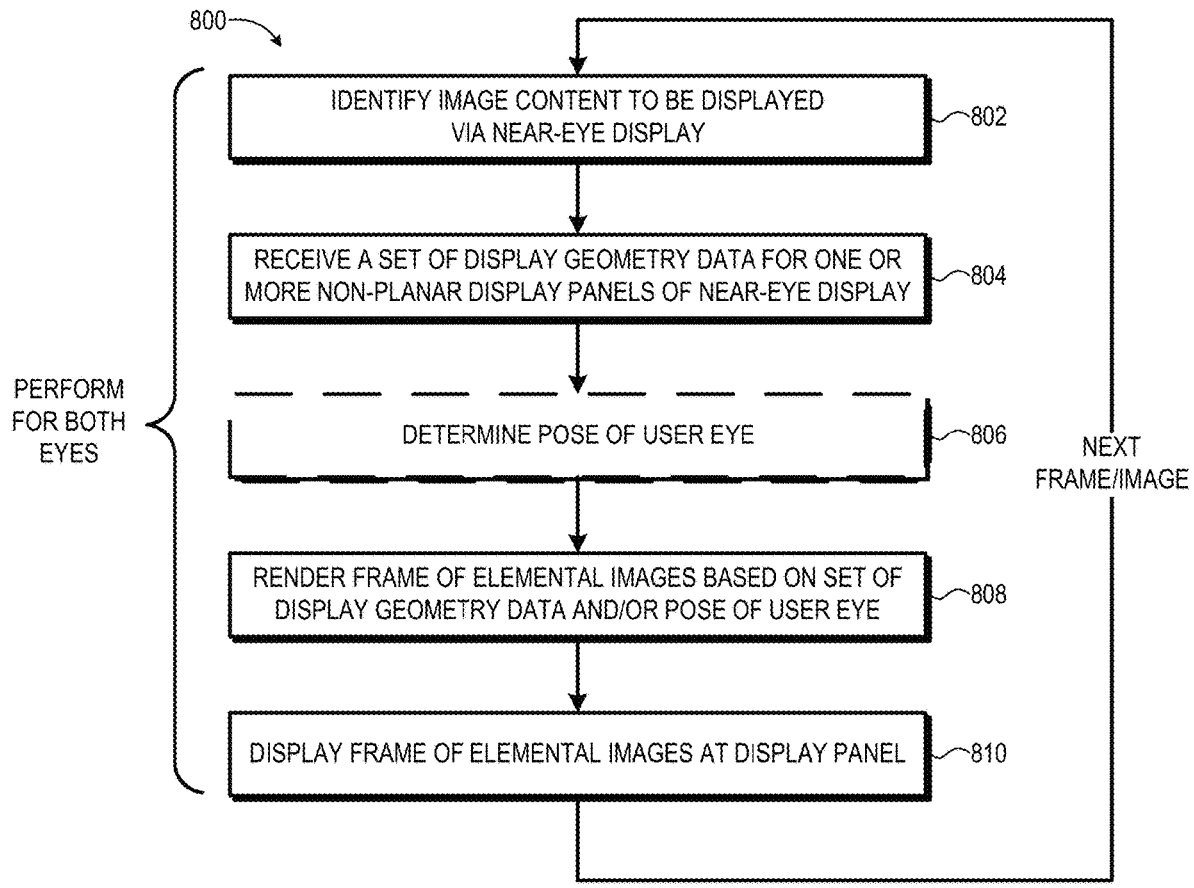
FIG. 8 is a flow diagram illustrating a method for generation of stereoscopic focus volumes in accordance with some embodiments.

FIG. 8 is a method 800 of operation of the near-eye display system 100 with non-planar computational displays for rendering lightfield frames based on stereoscopic focus volumes in accordance with some embodiments. To facilitate understanding, method 800 is described below with frequent reference to example scenarios illustrated by FIGS. 1-7. The method 800 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 800 starts at block 802, whereby the rendering component 104 identifies the image content to be displayed to the corresponding eye of the user as a lightfield frame. In at least one embodiment, the rendering component 104 receives the IMU information 152 representing data from various pose-related sensors, such as a gyroscope, accelerometer, magnetometer, Global Positioning System (GPS) sensor, and the like, and from the IMU information 150 determines a pose of the apparatus 114 (e.g., HMD) used to mount the displays 110, 112 near the user's eyes. From this pose, the CPU 136, executing the rendering program 144, can determine a corresponding current viewpoint of the subject scene or object, and from this viewpoint and graphical and spatial descriptions of the scene or object provided as rendering information 148, determine the imagery to be rendered for the pose.

At block 804, the CPU 136 receives a set of display geometry data for one or more non-planar display panels of near-eye display system 100. In at least one embodiment, the set of display geometry data includes data representing the geometric configuration (e.g., an angle of the optical axis) of the one or more non-planar display panels relative to the user's eye(s), such as illustrated in FIG. 3. In other embodiments, the set of display geometry data includes data indicating that the one or more non-play display panels are segmented and include a plurality of display panel segments, such as illustrated in FIG. 4. If the near-eye display system 100 includes a plurality of display panel segments, the set of display geometry data may further include data representing positions of the display borders/bezels of the display panel segments. In other embodiments, the set of display geometry data includes data indicating curvature geometry of the one or more non-planar display panels, such as illustrated in FIGS. 5 and 6.

At optional block 806, the CPU 136, executing eye tracking program 146, determines the pose of the corresponding eye of the user. As explained herein, the pose of an eye may be determined using any of a variety of eye tracking techniques. Generally, such techniques include the capture of one or more images of IR light reflected from the pupil and cornea of the eye. The eye tracking program 146 then may manipulate the CPU 136 or the GPUs 138, 140 to analyze the images to determine the pose of the eye based on the corresponding position of one or both of the pupil reflection or corneal reflection. For example, in some embodiments, monocular eye tracking is performed to obtain region of interest information and calculate where an eye of the user is attempting to accommodate in a rendered scene (e.g., which object(s) in a scene is the gaze of the eye directed towards). By performing monocular eye tracking for each eye, a relative angular displacement between the two eyes is measured to determine vergence. Accordingly, accommodation is calculated based on the determined vergence (e.g., differential eye tracking). In other embodiments, binocular eye tracking is performed to determine accommodation independent of rendered scene content and/or orientation of the pupil relative to the cornea in turn may be used to determine the orientation of the eye (that is, the direction of gaze of the eye). It should be noted that although block 806 is illustrated in FIG. 8 as being subsequent to blocks 802 and 804, the process of block 306 may be performed before, during, or after the processes of block 802 and 804.

With the geometry of the one or more non-planar display panels (and in some embodiments, the pose of the user's eye) determined, at block 808 the rendering program 144 manipulates the CPU 136 to instruct the corresponding one of the GPUs 138, 140 to render a lightfield frame with array 120 using the image content identified at block 802, whereby the lightfield frame includes an array of elemental images. In some embodiments, as part of this process, the CPU 136 calculates a stereoscopic focus volume within the image content (i.e., virtual image) to be displayed. In particular, the CPU 136 calculates a stereoscopic focus volume such that the non-planar display panels present objects within the stereoscopic focus volume to be in focus. For example, in the context of FIG. 3, a left eye focus volume 308 would appear to be in focus to the left eye 132 of the user when presented for display by the display panel 118 of the left-eye display 110. Similarly, objects within a right eye focus volume 310 would appear to be in focus to the right eye 132 of the user when presented for display by the display panel 118 of the right-eye display 112. Accordingly, the CPU 136 determines that the left eye focus volume 308 and the right eye focus volume 310 overlap at a stereoscopic focus volume 312, and lightfield frames are rendered such that objects within the stereoscopic focus volume 312 would appear to be in focus to both the left and right eyes 132 of the user.

In some embodiments, such as in the context of FIG. 4, each of the left- and right-eye displays 110, 112 may include any "N" number of display panel segments. For example, as illustrated in view 400, each of the displays 110, 112 includes two non-planar display panel segments (i.e., display panel segments 118a and 118b). Each of the display panel segments (e.g., display panel segments 118a and 118b of displays 110, 112) is associated with a corresponding focus volume within which objects would appear to be in focus when presented for display to their respective eyes 132. Accordingly, the CPU 136 determines that these focus volumes overlap at a stereoscopic focus volume 408, and lightfield frames are rendered such that objects within the stereoscopic focus volume 408 would appear to be in focus to both the left and right eyes 132 of the user.

Further, in other embodiments, such as in the context of FIG. 7, a gap 702 exists between the display panel segments 118a and 118b due to, for example, the display border/outside frame of a housing that holds the display panel segments 118a, 118b. Accordingly, the CPU 136 provides the data representing positions of the display borders/bezels of the display panel segments of block 804 and the pose of the user's eye of block 806 to the GPU and instructs the GPU to render the lightfield frame such that the elemental images are rendered to hide the gap 702 between the display panel segments 118a and 118b such that the composite virtual image 704 as perceived by the user's eye 132 does not detect the presence of the gap 702. That is, the intensities of the elemental images corresponding to regions 706 and 708 may be adjusted to compensate for and prevent perception of the gap 702 caused by display borders of the one or more non-planar display panels. The GPU subsequently renders the lightfield frame at block 810 and provides the lightfield frame to the corresponding one of the computational displays 110, 112 for display to the eye 132 of the user.

The non-planar computational display configurations illustrated by FIGS. 1-7 have the benefit of providing a nearer to eye "eyeglass" form factor while retaining a large field-of-view. That is, the embodiments described herein allow for a more compact and reduced-weight form-factor (relative to the "diving mask" form factor of conventional HMDs). Through the use of non-planar display panel sections with different curvatures and/or orientations relative to the user's eye, the HMD device may be fabricated with a form factor that maintains the bulk of the HMD device closer to the user's head, thereby reducing its moment of inertia as well as providing a wider lateral field of view and a more aesthetically pleasing appearance. Additionally, the use of non-planar displays with sections having different curvatures and angles permits the implementation of an HMD device with a form factor that more closely conforms to the user's head compared to conventional HMD devices that utilize one or more flat display panels, while also providing a more uniform color and brightness across the field of view and a less complex display and optical assembly configuration compared to conventional HMD devices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a near-eye display system, a method comprising:
   receiving display geometry data for one or more non-planar display panels of the near-eye display system;
   rendering, based on a stereoscopic focus volume associated with the display geometry data of the one or more non-planar display panels, an array of elemental images at a position within a near-eye lightfield frame, wherein the stereoscopic focus volume is based on an overlap between a plurality of focus volumes presented by the one or more non-planar display panels, wherein the one or more non-planar display panels presents objects within respective focus volumes of the plurality of focus volumes to be in focus, and wherein the one or more non-planar display panels presents objects within the stereoscopic focus volume to be in focus; and
   communicating the near-eye lightfield frame for display at the one or more non-planar display panels of the near-eye display system.

2. The method of claim 1, wherein receiving the display geometry data comprises:
   receiving data that indicates the one or more non-planar display panels comprises a plurality of display panel segments.

3. The method of claim 2, wherein rendering the array of elemental images further comprises:
   determining a focus volume of the plurality of focus volumes for each of the plurality of display panel segments, wherein each of the plurality of display panel segments presents objects within its corresponding focus volume to be in focus; and
   determining the stereoscopic focus volume based at least in part on an overlap between the focus volume for each of the plurality of display panel segments.

4. The method of claim 1, wherein receiving the display geometry data comprises:
   receiving data that indicates curvature geometry of the one or more non-planar display panels.

5. The method of claim 1, wherein receiving the display geometry data comprises:
   receiving data that indicates a set of display border data representing positions of display borders of the one or more non-planar display panels.

6. The method of claim 5, further comprising:
   determining, using an eye tracking component of the near-eye display system, a pose of a user's eye; and
   modifying, based on the pose of the user's eye and the set of display border data, the rendering of the array of elemental images to prevent perception of the display borders of the one or more non-planar display panels by the user's eye.

7. The method of claim 6, wherein determining the pose of the user's eye comprises:
   capturing imagery of the user's eye using an imaging camera disposed between the one or more non-planar display panels and the user's eye.

8. The method of claim 1, further comprising:
rotating a position of a virtual plane within the stereoscopic focus volume by shifting display position of the array of elemental images.

9. The method of claim 1, further comprising:
rotating a position of a virtual plane within the stereoscopic focus volume by changing a fold angle between two or more non-planar display panels.

10. A near-eye display system, comprising:
one or more non-planar display panels to display a near-eye lightfield frame comprising an array of elemental images;
a rendering component to render, based on a stereoscopic focus volume associated with a set of display geometry data of the one or more non-planar display panels, the array of elemental images in the near-eye lightfield frame such that objects within the stereoscopic focus volume are presented as being in focus, wherein the stereoscopic focus volume is based on an overlap between a plurality of focus volumes presented by the one or more non-planar display panels such that objects within respective focus volumes of the plurality of focus volumes are presented as being in focus; and
a lenslet array to present the near-eye lightfield frame to a user's eyes.

11. The near-eye display system of claim 10, wherein the rendering component is further to determine the stereoscopic focus volume by:
receiving data that indicates the one or more non-planar display panels comprises a plurality of display panel segments;
determining a focus volume of the plurality of focus volumes for each of the plurality of display panel segments, wherein each of the plurality of display panel segments presents objects within its corresponding focus volume to be in focus; and
determining the stereoscopic focus volume based at least in part on an overlap between the focus volume for each of the plurality of display panel segments.

12. The near-eye display system of claim 10, wherein the rendering component is further to determine the stereoscopic focus volume by:
receiving data that indicates a set of display border data representing positions of display borders of the one or more non-planar display panels;
determining, using an eye tracking component of the near-eye display system, a pose of a user's eye of the user's eyes; and
modifying, based on the pose of the user's eye and the set of display border data, the rendering of the array of elemental images to prevent perception of the display borders of the one or more non-planar display panels by the user's eyes.

13. The near-eye display system of claim 10, further comprising:
an eye tracking component to track a pose of a user's eye of the user's eyes, wherein the eye tracking component comprises a set of one or more infrared (IR) illuminators to project light onto the user's eye and an imaging camera disposed between the lenslet array and the one or more non-planar display panels and oriented towards the user's eye through the lenslet array.

14. The near-eye display system of claim 10, wherein the one or more non-planar display panels comprises:
a single continuous display panel including different lateral portions having differing degrees of curvature.

15. The near-eye display system of claim 10, wherein the one or more non-planar display panels comprises:
a plurality of flat panel displays positioned in a non-planar orientation relative to each other.

16. A rendering system, comprising:
at least one processor;
an input to receive data indicating a set of display geometry data for one or more non-planar display panels of a near-eye display system; and
a storage component to store a set of executable instructions, the set of executable instructions configured to manipulate the at least one processor to render, based on a stereoscopic focus volume associated with the set of display geometry data of the one or more non-planar display panels, an array of elemental images at a position within a near-eye lightfield frame, wherein the stereoscopic focus volume is based on an overlap between a plurality of focus volumes presented by the one or more non-planar display panels, wherein the one or more non-planar display panels presents objects within respective focus volumes of the plurality of focus volumes to be in focus, and wherein the one or more non-planar display panels presents objects within the stereoscopic focus volume to be in focus.

17. The rendering system of claim 16, wherein the set of executable instructions are further configured to determine the stereoscopic focus volume by:
receiving data that indicates a set of display border data representing positions of display borders of the one or more non-planar display panels;
determining, using an eye tracking component of the near-eye display system, a pose of a user's eye; and
modifying, based on the pose of the user's eye and the set of display border data, the rendering of the array of elemental images to prevent perception of the display borders of the one or more non-planar display panels by the user's eye.

18. The rendering system of claim 16, wherein the set of display geometry data comprises data that indicates the one or more non-planar display panels comprises a plurality of display panel segments.

19. The rendering system of claim 18, wherein the set of executable instructions are further configured to render the array of elemental images by:
determining a focus volume of the plurality of focus volumes for each of the plurality of display panel segments, wherein each of the plurality of display panel segments presents objects within its corresponding focus volume to be in focus; and
determining the stereoscopic focus volume based at least in part on an overlap between the focus volume for each of the plurality of display panel segments.

20. The rendering system of claim 16, wherein the set of executable instructions are further configured to render the array of elemental images by:
rotating a position of a virtual plane within the stereoscopic focus volume by shifting display position of the array of elemental images.

* * * * *